United States Patent [19]

Nakaji

[11] Patent Number: 4,974,663
[45] Date of Patent: Dec. 4, 1990

[54] CROSS-CIRCULATING METHOD AND APPARATUS FOR AUTOCLAVE

[75] Inventor: Masashi Nakaji, Kyoto, Japan

[73] Assignee: Ashida MFG. Co., Ltd., Kadoma, Japan

[21] Appl. No.: 324,001

[22] Filed: Mar. 16, 1989

[30] Foreign Application Priority Data

Jun. 30, 1988 [JP] Japan ................... 63-164181

[51] Int. Cl.$^5$ ................... F27B 9/04; F27B 5/04; F27D 7/00; F27D 7/04
[52] U.S. Cl. ................... 165/1; 165/58; 165/61; 422/242; 422/295; 432/23; 432/199; 432/152; 432/205; 432/206
[58] Field of Search ................... 432/176, 23, 199, 152, 432/205, 206; 422/242, 295; 165/1, 58, 61

[56] References Cited

U.S. PATENT DOCUMENTS

| | | | |
|---|---|---|---|
| 1,923,145 | 8/1933 | Harsch | 432/199 |
| 2,676,007 | 4/1954 | Davis | 432/176 |
| 2,686,665 | 8/1954 | Tauber et al. | 432/176 |
| 2,998,236 | 8/1961 | Cramer et al. | 432/199 |
| 3,347,723 | 10/1967 | Hill | 422/242 |
| 4,094,631 | 6/1978 | Grieve | 432/176 |
| 4,412,815 | 11/1983 | White et al. | 432/206 |

FOREIGN PATENT DOCUMENTS

| | | | |
|---|---|---|---|
| 58-62018 | 4/1983 | Japan . | |
| 0161734 | 8/1985 | Japan | 422/242 |
| 0258996 | 12/1985 | Japan . | |
| 61-94742 | 5/1986 | Japan . | |
| 62-28228 | 2/1987 | Japan . | |
| 62-42753 | 11/1987 | Japan . | |
| 62-54534 | 11/1987 | Japan . | |

OTHER PUBLICATIONS

Baron Autoclaves, "Meeting the Challenges of Bonding and Curing Complex Shapes and Forms", Baron--Blakeslee, California-Brochure (no date).

Primary Examiner—John Ford
Attorney, Agent, or Firm—Fleit, Jacobson, Cohn, Price, Holman & Stern

[57] ABSTRACT

A method for circulating a gas in an autoclave which comprises a pressure container (A) having a wind tunnel (7) in which moldable materials (1) are placed and the gas is circulated by a blow fan (33), the pressure container (A) being sealably closed by a door, the layers of each of the materials (1) are compressed, heated, adhered together, and set in the pressure container (A) producing swirling of the gas coming out of an outer duct formed between the inner face Aa of the pressure container (A) and the wind tunnel (7) by guide blades (H), diverting the gas at the inner face (2a) of the door (2), and directing the diverted gas to flow through the inside (7b) of the wind tunnel (7) with the swirl. The apparatus for circulating gas has guide blades (H) for swirling the gas going out of the outer duct (7a) provided in the outer duct, whereby the gas is diverted at the inner face (2a) of the door (2), and is directed to flow through the inside (7b) of the wind tunnel (7) with the swirl.

10 Claims, 8 Drawing Sheets

CROSS-CIRCULATING METHOD AND APPARATUS FOR AUTOCLAVE

BACKGROUNd OF INVENTION

The present invention relates to a gas circulating method and apparatus for an autoclave which is used to heat and compress such moldable materials as multilayered structures made of fiber reinforced plastics (FRP) used as parts of aircraft and industrial machines, and tools etc., and moldable elements such as multilayered print wiring circuit boards used as parts of electronic devices.

Hitherto, many techniques which heat and compress the moldeble materials of FRP or print wiring, circuit boards within an autoclave to mold them are known from such publication as Japanese laid-open patent publications Nos. 58-62018, 60-258996, 61-94742, and 62-28228 for example.

Figure 5:
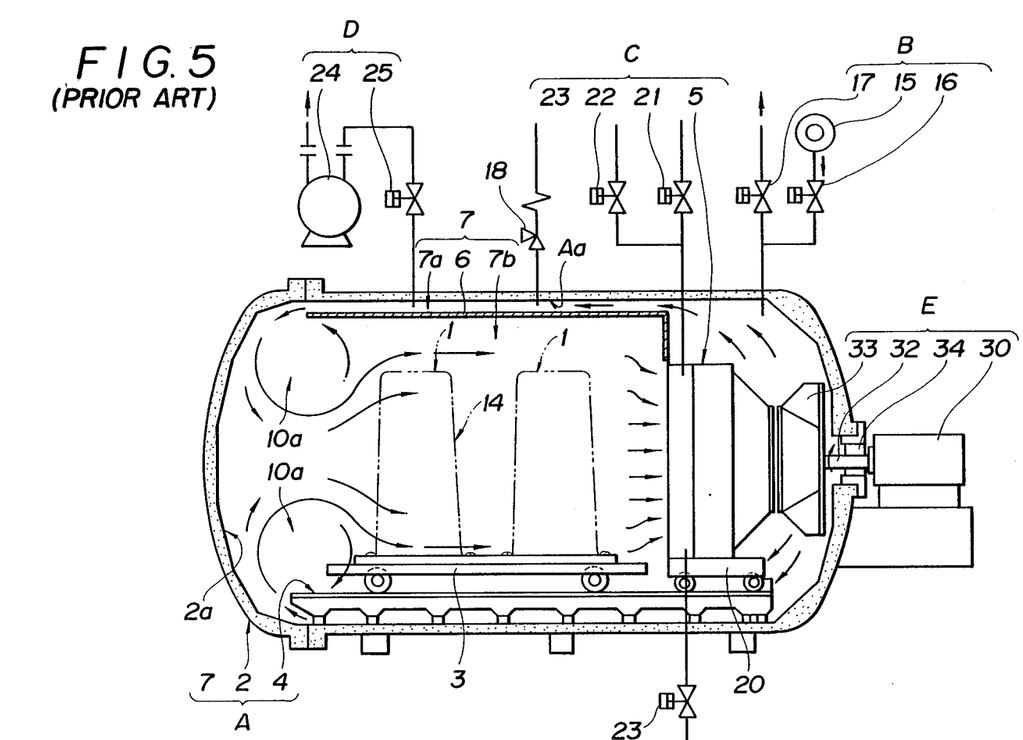
FIG. 5 is a view smilar to FIG. 1 showing a covential apparatus.
Figure 6:
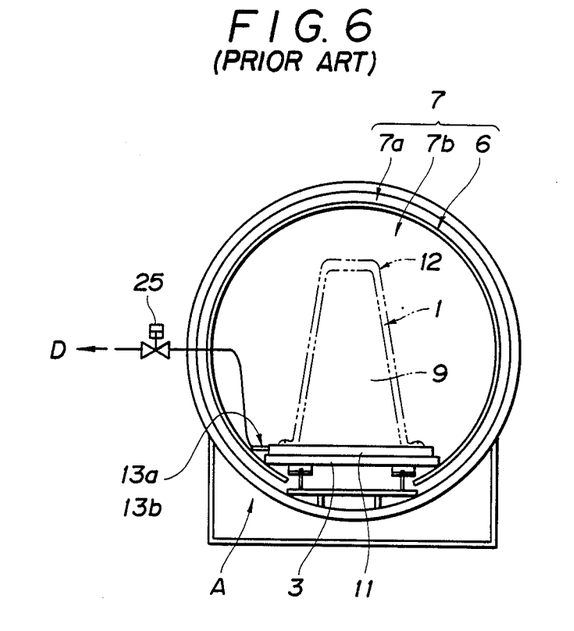
FIG. 6 is a schematic front view of the apparatus of FIG. 5, with the door open; and, FIG. 7 is view similar to FIG. 3a showing the distribution of the wind velocity in the wind tunnel of the conventional apparatus.
Figure 7:
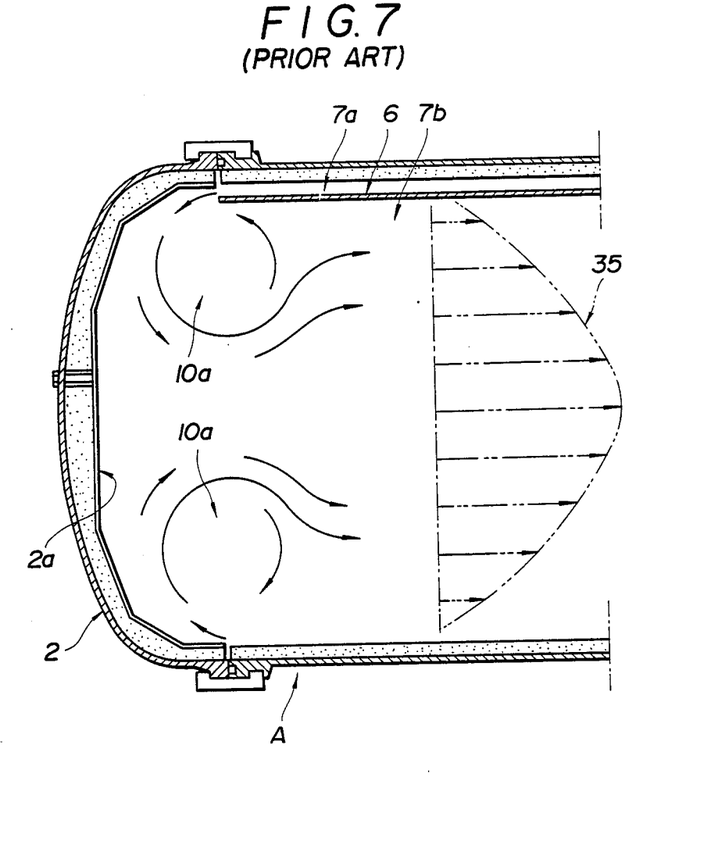

As shown in FIGS. 5, 6 and 7, these techniques comprises: a pressure container A having a wind tunnel 7, in which moldable materials 1 are placed and gasses are circulated by a blower fan 33, the container A being sealably closed by a door 2; compressing means B for supplying high pressure gasses into the pressure container to compress the moldable materials 1; means C for heating and cooling the high pressure gasses contained in the container with a heat exchanger 5 settled rearwardly in the inside of the pressure container; a fan driving unit E including a motor 30 which is located outside of the pressure container and carriers the fan 33 in the container, passing through a sealing unit 34, the fan 33 being driven to circulate the gasses heated or cooled by the heating and cooling means into the inside 7b of wind tunnel 7 through its outer duct 7a; and means D for highly depressuring the inside of a vacuum bag 12 containing the moldable materials 1 and closed up tightly.

Furthermore, as shown in FIGS. 5 and 6, the moldable materials 1 are placed on a jig., or mold 9 of a bed 11, covered with a breather cloth and the vacuum bag 12 in turn, and sealed closed by sealant (made of silicone sealing agent). The enclosed materials 1 are then brought into the pressure container A, and the external depressurizing means D is communicated with the inside of the vacuum bag 12 so as to depressurize it after the pressure container is sealed. After the inside of the vacuum bag 12 is depressurized, a high pressure gas (inert gas) is supplied in the pressure container A and heated therein so as to compress the moldable materials 1. The heated high pressure gas is, for circulation, driven by the fan 33 to flow through the outer duct 7a of the wind tunnel 7, and be diverted by the door's inner wall face 2a into the inside 7b of the wind tunnel, whereby the layers of the moldable materials 1 are compressed and heated to be molded, stiffened and bound together.

Those techniques, however, have such problems as described below.

The gas which is driven by the fan 33 to flow through the outer duct 7a formed between the inner wall Aa of the container and the wind tunnel wall 6, and to the diverted by the inner wall face 2a of the door has large cavities 10a (air pockets) extending over the range between the distal end of the outer duct 7a and the inside 7b of the wind tunnel, as shown in FIG. 5. Therefore, the distribution of the velocity of the wind is disoriented to spread the distribution of the temperature of the gas in a disordered manner. Further, the gas flowing through the inside 7b of the wind tunnel tends to coverge at the center of the inside 7b of the wind tunnel, whereby the distribution 35 of the velocity of the wind shown in FIG. 7 is obtained.

As a result, the moldable materials 1 respectively placed near the entrance of the pressure container A and near the inner periphery of the inside 7b of the wind tunnel are not heated equally, and in addition the materials 1 put under the wind having such distribution of the velocity do not receive enough wind on the downstream side 14 shown in FIG. 5, whereby the materials 1 are unequally heated on the different portions thereof which receive or do not receive the wind. Thus, the products finished through the stiffening and adhering have problems in their quality due to the unequal heating. Consequently, the products having the unequally adhered layers can not be used as parts and structures of spacecraft devices aircraft, etc. which attach great importance to the reliability of the parts.

Therefore, the entrance area of the pressure container A and the peripheral area of the inside 7b of the wind tunnel can not be reliably used. Moreover, the spaces between materials 1 placed on the bed need to be broadened so as to avoid the unequal heating on the downstream sides 14 of the materials 1, which results in substantially preventing the effective use of the autoclave.

SUMMARY OF INVENTION

It is an object of the present to provide a method and an apparatus for circulating gasses in an autoclave, both of which avercome the above-stated problems of the prior art.

In accordance with the present invention, the apparatus for circulating gasses in an autoclave comprises a pressure container having a wind tunnel in which moldable materials 1 are placed and gasses are circulated by a blower fan the container being sealably closed by a door 2; compressing means for supplying high pressure gasses into the pressure container to compress the moldable materials; and means for heating and cooling the high pressure gasses contained in the pressure container in order to compress and heat the materials and thus render the layers of the materials 1 bound together and stiffened; the apparatus being characterized in that guide blades are provided in the outer duct by which the gas flow which comes out of the distal end of the outer duct formed between the inner wall face of the pressure container and the wind tunnel wall is guided to gyrate and is then diverted by the inner face of the door to pass through the inside of the wind tunnel with whirling.

The method for circulating or rotating gasses in an autoclave, according to the present invention, comprises: swirling the gas flow which comes out of the outer duct formed between the inner face of the pressure container and the wall of the wind tunnel with the aid of guide blades and diverting the gas flow at the opposite inner face of the door into the inside of the wind tunnel so that the gas gyrates during passing through the inside 7b.

BRIEF DESCRIPTION OF DRAWINGS

The invention will be better understood by reference to the following detailed description, taken in conjunction with the accompanying drawings, wherein:

FIG. 4a is a schematic view taken along line Y—Y in FIG. 3a;

FIG. 4b is a schematic side view of the guide blades as seen in the direction of arrow Z—Z in FIG. 4a;

DESCRIPTION OF THE PREFERRED EMBODIMENTS

Embodiments of the present invention will now be described with reference to the drawings.

As shown in FIGS. 1 through 4c, an embodiment of the apparatus of the present invention for an autoclave comprises; a pressure container A having a wind tunnel 7, in which moldable materials 1 are contained and gasses are circulated, the container A being sealably closed by a door 2; compressing means B for supplying high pressure gasses into the pressure container A to compress the moldable materials 1; means C for heating and cooling the high pressure gasses contained in the container with a heater 26 and a heat exchanger 5 disposed rearwardly in the inside of the pressure container; means D for highly depressurizing the inside of a vacuum bag 12 for sealing the materials 1 therein; and a fan driving unit E for forcing gasses heating or cooled by the heating and cooling means into the inside of the pressure container; in order that the layers of the moldable materials 1 are compressed, heated, adhered together, and stiffened; the apparatus being characterized in that guide blades H are provided in an outer duct 7a formed between the inner wall face Aa of the pressure container and the wall 6 of the wind tunnel, so that the gas flow coming out of the distal end of the outer 7a guided by the guide blades H to gyrate and is diverted by the opposite inner wall face of the door 2 to pass through the inside 7b of the wind tunnel.

Each of the means, members and units will now be more fully described.

Figure 1:
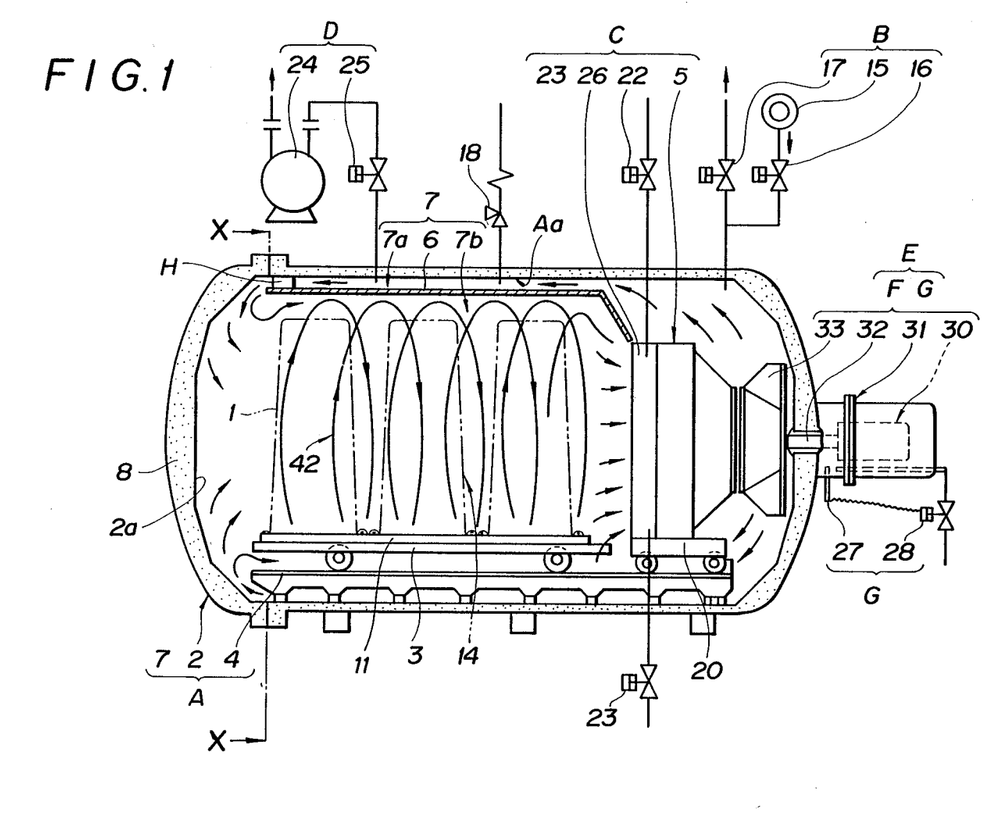
FIG. 1 is a partly schematic and longitudinal cross-sectional showing one embodiment of the apparatus according to the present invention.
Figure 2:
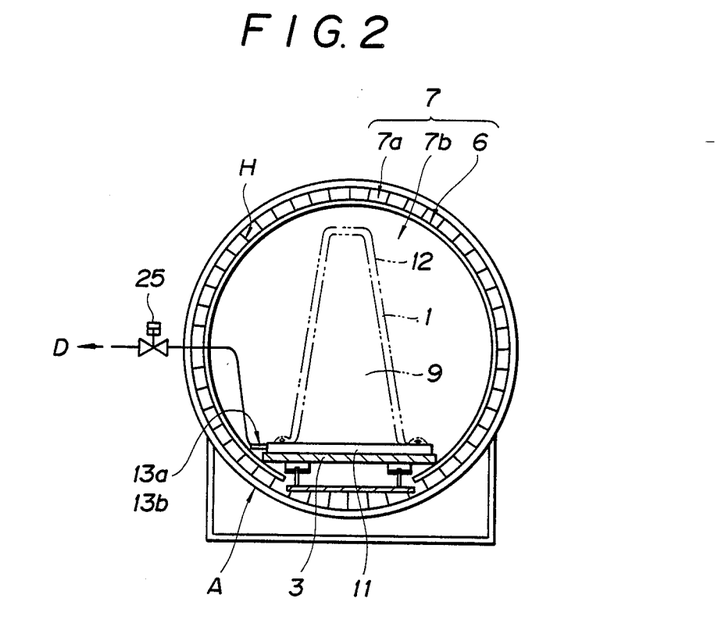
FIG. 2 is a partly schematic and cross-sectional view taken along line X—X in FIG. 1.

As shown in FIGS. 1 and 2, in the pressure container A, the moldable materials 1 and concealed in the vacuum bags 12, are placed on the bed (or platen) 11 of a cart 3 supported on rails 4 and conveyed out and into the container A, which is tightly closed with the door 2. Container A is divided into outer duct 7a and the inside 7b of wind tunnel 7 by the cylindrical thin wall plate 6 which is disposed along and radially inwardly spaced from the inner wall face Aa of pressure container A forwardly of the heat exchanger 5, and the fan driving unit E is positioned rearwardly of the pressure container A. Moreover, the pressure, container A is backed with a heat shield material 8 overall on its inner surface.

The bed 11 has a smooth surface thereon, and has a passage for vacuum (not shown) approximately in the central portion thereof. The passage for vacuum can be controlled to have the air in the multilayered moldable materials 1 artightly packed in the vacuum bags 12 communicated with and isolated from the external depressurizing means D through vacuum couplings 13b, 13a shown in FIG. 2. For producing aircraft structures or large-sized parts, the materials 1 on the bed are covered with air breather cloths, which are then covered with the vacuum bags, from appropriate parts of which the air can be evacuated.

The compressing means B is provided to supply into the pressure container A from a high pressure gas supplying unit 15 through an automatic valve 16 high pressure gasses, such as high pressure nitrogen gas, high pressure carbonic acid gas, and high pressure air etc. having pressures not higher than 20 Kg/cm$^2$. The gasses are heated or cooled by the heater 26 or heat exchanger 5, and discharged through an automatic valve 17. A saftey valve 18 relieves the pressure in the pressure container A when it exceeds a predetermined value.

The heating and cooling means C shown in FIG. 1 includes the electrical heater 26 and heat exchanger 5 mounted on a second cart 20 located rearwardly in the inside of the pressure container A adjacent the outside thereof. Heater 26 and heat exchanger 5 (which is used as a cooler in this case) are supplied with cooling water to heat or cool the gasses in the pressure container. The cooling water is supplied through an automatic valve 22 which in communicated with the heat exchanger 5 by a line passing through the pressure container A. The waste water is drained through an automatic valve 23 which is communicated with the lower part of the heat exchanger 5 by a line passing through the lower wall of the pressure container A.

Alternatively, the heating and cooling means may be disposed outside of the pressure container A, with the gasses being heated and cooled and led into the pressure container A by lines. The heating means may use, instead of an electrical heater, high pressure steam which is supplied through an automatic valve 21 shown in FIG. 5, wherein heat exchanger 5 is used for both heating and cooling.

The depressurizing means D has a vacuum pump 24 located outside of the pressure container A as shown in FIGS. 1 and 2. The vaccum pump 24 is communicated with the inside of the pressure container A by a pipe through an automatic valve 25. A vacuum coupling 13a shown in FIG. 2 and connected to the forward end of the pipe is removably joined to a vacuum coupling 13b which is sealably connected to the vacuum bag 12 and communicated with the inside thereof. The vacuum pump 24 acts to depressurize to a high degree of vacuum the insides of the vacuum bags 12 airtightly covering the moldable materials 1.

The fan driving unit E includes fan driving means E and means G for cooling a motor, as shown in FIGS. 1 and 2. The fan driving means E has a motor 30 disposed on the outside of the rearward end of the pressure container A, and a small-sized container (small-pressure container) 31 sealably surrounding the motor 30, which has the motor shaft 32 extending through a wall of the container A to carry a blower fan 33, which is engagedly fixed on the shaft 32. The motor cooling maeans G has a temperature sensor 27 for sensing temperatures of the gasses in the small-sized container 31, and an automatic valve 28 for rceiving signals from the sensor 27, with which the cooling means G cools controls and keeps the temperature of the motor in the small-sized container lower than the maximum permitted.

As shown the FIG. 5, in another embodiment of the fan driving unit, the shaft 32 of the motor 30 extends into the inside of the pressure container A from the motor 30 located outside of the container A, passing through a sealing unit 34 so as to have the blower fan 33 engagedly fixed on the forward end of the shaft 32.

The guide blades H, as seen in FIGS. 1 through 4c, are arranged in the outer duct 7a and act to swirl the gas flow coming out of the distal end of the outer duct 7a formed between the inner wall face Aa of the pressure container and the wall 6 of the wind tunnel. The embodiment shown in FIGS. 3a and 4a has a number of blades 40 arranged all over the circumferential outlet of the outer duct 7a, which blades 40, as shown in FIG. 3b, are variably angled and fixed on supporting posts 41 which have outwardly threaded forward ends, so that they can guide the gasses flowing straight into suitable directions. In more detail, as shown in FIGS. 3b and 3c, each of the blades 40 has a blade plate 40a and a boss 40b integrally formed in the central cutout of the plate 40a. The boss 40b has a famale screw portion, in which the threaded end of the supporting post 41 passing through the wind tunnel wall 6 is engaged, whereby the blade can be fixed in suitable angle. The blade 40 of the embodiment shown in FIG. 3c has a suitably curved configuration to obtain desirable vortexes 42 of the gas.

Figure 3A:
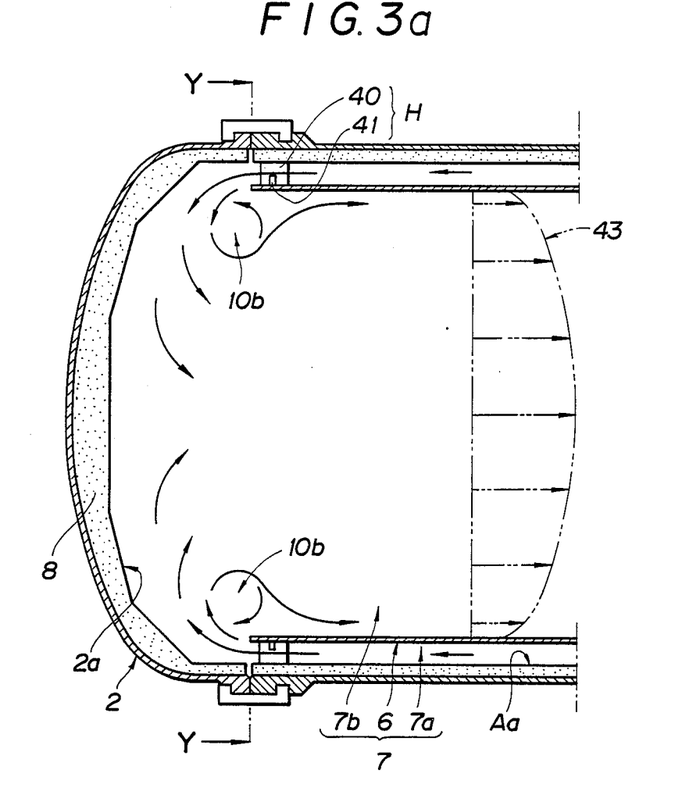
FIG. 3a is a view similar to FIG. 1 of the left part thereof, enlarged, showing the manner in which the guide blades in accordance with the present invention are fitted.
Figure 3B:
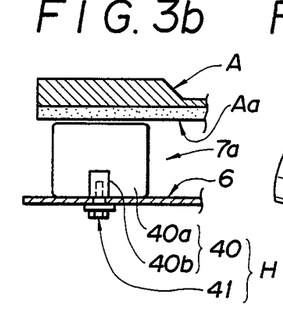
FIG. 3b is a greatly enlarged cross-sectional detail showing the manner in which the guide blades are fitted.
Figure 3C:
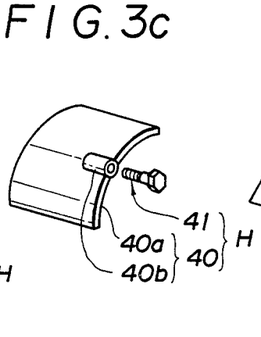
FIG. 3c is an enlarged perspective view showing the structure of set of the guide blades.
Figure 3D:
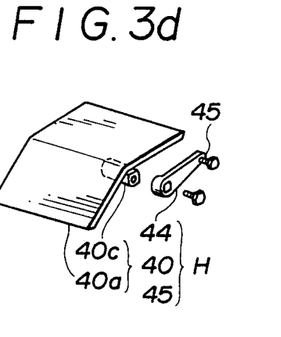
FIG. 3d is an enlarged perspective view showing another embodiment of the guide blade.

As shown in FIG. 3d, another embodiment of the guide blade H has a lever 44 which is fixed to the blade 40 by a fastening member which passes through the wind tunnel wall 6 to be fixed into the axis 40c of the blade 40, whereby the blade plate 40a can be fixed in an desirable angle by a bolt 45. In this structure, the angle of each blade can be indicated by the angle of the lever 44, so that the orientation of the blade H can be confirmed even when it is located near the interior of the outer duct 7a. As shown in FIG. 4c, all of the levers 44 may be linked together at their free ends by a ring plate 46 for example, which is located along the inner periphery of the wall 6, and automatically or manually actuated along the periphery so as to simultaneously adjust all of the guide blades H to easily control the vortexes 42.

Figure 4A:
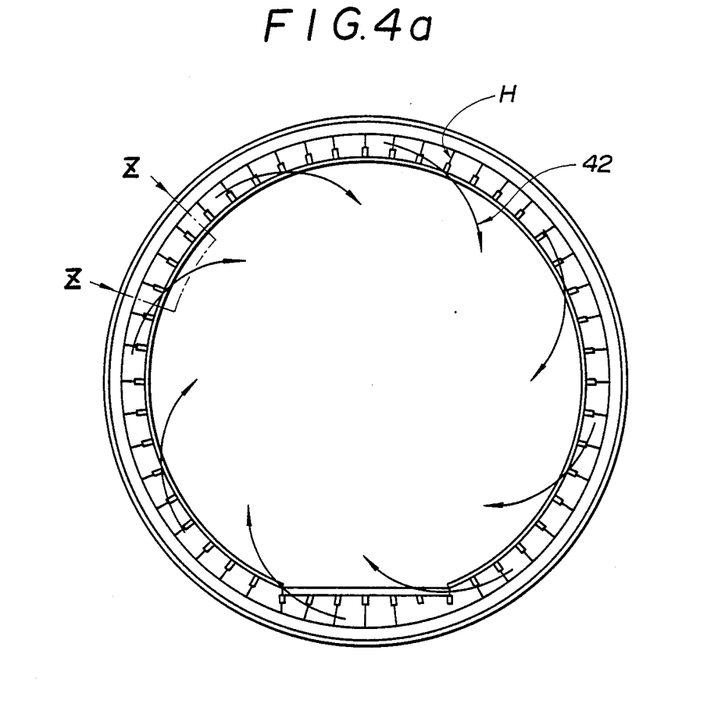
Figure 4B:
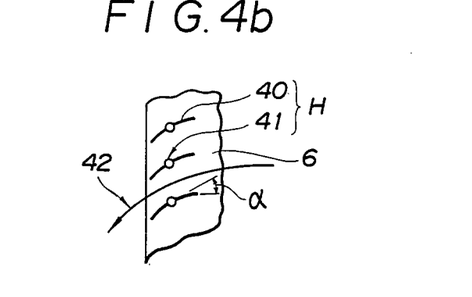
Figure 4C:
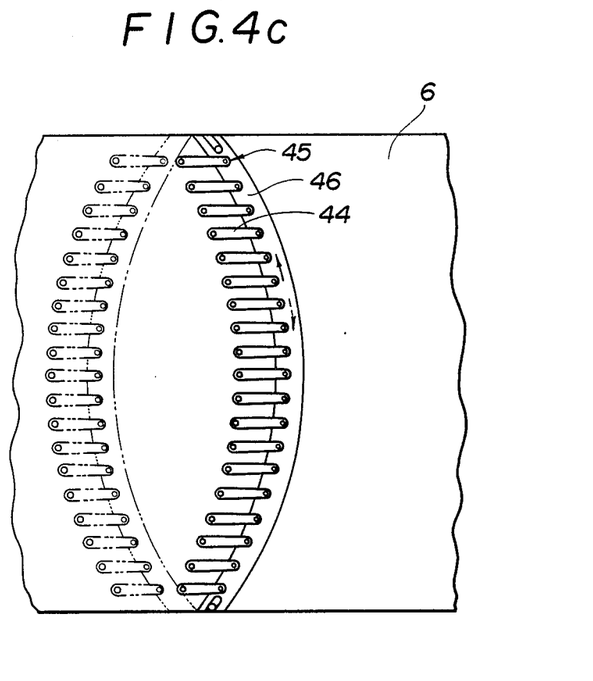
FIG. 4c if a schematic view showing a mechanism for simultaneously adjusting the angles of the numerous guide blades showin the FIG. 3d.

In the embodiment shown in FIG. 4b, the blade 40 has its mounting angle a settled at about 30 degree, which is, however, able to be suitably determined depending on the size and length of the wind tunnel 7, the configuration ans size of the moldable materials 1 and so on. For example, when the angle of the blade 40 is smaller, the vortex 42 has a larger pitch and approaches a straight line, so that less of the gas contacts on the rear sides (relative to flow) of the moldable materials placed in the inside 7b of the wind tunnel during flowing therethrough. The larger the angle, the smaller the pitch of the vortex 42, thus having less straightness, whereby more of the gas in the form of fine vortexes in the inside 7b of the wind tunnel can contact on the rear sides of the materials during flowing, so as to reduce the effects of the rear sides. Consequently, optimum angles of the blades can be employed corresponding to the objects being molded.

Although the blades H are arranged in the outlet of the outer duct 7a in the preceding embodiments, they can be disposed in any positions in the outer duct 7a as also seen in FIG. 4c. The number and spacing of the blades are suitably changed according to the size of the wind tunnel and the wind velocity etc., and thus not limited to those of the embodiments.

In this manner, the gas which is driven by the blower fan 33 to flow straight in the outer duct 7a is led into the vortexes 42 by the blades 40. The gas in the form of vortexes goes out of the distal end of the outer duct 7a, and is then diverted at the inner wall face 2a of the door into the inside 7b of the wind tunnel as shown by arrows in FIG. 1. Thereafter the gas is sucked into the heat exchanger 5 to pass therethrough, and the gas circulates again in the pressure container A with the aid of the blower fan 33. The vortexes described herein gyrate in the inside 7b of the wind tunnel, while passing therethrough, so as not to have any cavities within themselves.

As a result, only the extremely small air pockets 10b shown in FIG. 3a can be produced between the distal end (outlet) of the outer duct 7a and the inside 7b of the wind tunnel. Since the gas flows in the form of vortexes gyrating through the inside 7b of the wind tunnel, after being diverted at the inner face 2a of the door, it can surround all over the materials put in the inside 7b of the wind tunnel, while flowing therethrough as shown in FIG. 1. The distribution 43 of the wind velocities in any portions of the wind tunnel inside 7b is therefore flattened as shown in FIG. 3a by a chain-line having two dots between every two adjacent short lines. In addition, the rear sides 14 of the materials 1 receive the wind as shown in FIG. 1, because the vortexes 42 flow into the spaces between the materials 1. Thus, the distribution of the temperatures, at which the materials are heated, is also flattened.

In operation, the jigs (molds) 9 are first mounted on the bed 11 as shown on FIGS. 1 and 2. Moldable materials 1 are then loaded in the jigs 9, or molds, and covered with nonstick films and breather cloths etc. in turn, which are then covered with the vacuum bags 12, which are airtightly sealed up with the sealant. Thereafter, the bed 11 holding the sealed materials 1 thereon is loaded on the cart 3, and conveyed into the pressure container A.

Next, the vacuum coupling 13b are connected to the vacuum couplings 13a carried by the pipes in the pressure container A, which is thereafter airtightly closed with the door 2.

Then, the vacuum pump 24 and the automatic valve 25 shown in FIG. 1 are actuated to depressurize the insides of the vacuum bags 12.

With the insides of the vacuum bags depressurized in this manner, the air intervening among the layers of the materials 1 since the stacking thereof is first evacuated by the vacuum pump through the vacuum couplings 13b and 13a to the outside of the vacuum bags.

Next, the automatic valve 16 of the compressing means B shown in FIG. 1 is actuated to supply into the pressure container A a highly pressured gas, which compresses the moldable materials 1 via the vacuum bags 12, while the heater 26 of the heating and cooling means C is actuated to heat the high pressure gas in the pressure container A. In succession, the motor 30 of the fan driving means E is actuated to rotate the blower fan 33, which starts the heated gas to flow straight, as seen in FIG. 1, through the outer duct 7a formed between the inner face Aa of the pressure container and the wall 6 of the wind tunnel.

Then, the gas is deflected by the blades 40 of the numerous guide blades H to be converted into vortexes 42, thereafter the gas in the form of the vortexes goes out of the distal end of the outer duct 7a, and is diverted at the inner face 2a of the door into the inside 7b of the wind tunnel, in which the gas continues to gyrate during flowing. The gas is then sucked into the heat exchanger 5 to pass therethrough, and again circulates in the pressure container A, with the help of the blower fan 33.

As a result, the gas flows, surrounding all over the moldable materials in the inside 7b of the wind tunnel as shown in FIG. 1. Since the distribution 43 of the wind velocities in any sections of the inside 7b is generally and substantially flattened as shown by the chain-line having two dots between every two adjacent short lines in FIG. 3a, and the vortexes 42 flow into the spaces among the materials 1, the rear sides 14 of the materials 1 can receive the wind of the gas, so that the materials 1 are uniformly heated, even when they are closely spaced apart from each other.

Therefore, the heat maintained to heat the materials 1 is uniformly transmitted through the whole surfaces of the materials 1 into the interior areas thereof, with the static-pressure characteristic of the gas, even when the materials 1 have complicated shapes, so that the materials 1 are uniformly molded, according as the increase of the temperature of the heat.

Further, the temperature of the materials 1 is continuously elevated to reach a preset value, at which it is maintained for a while in order to have the layers of the materials 1 adhere together and set.

Thereafter, the heater 26 shown in FIG. 1 is turned off, and the automatic valve 22 is actuated to supply cooling water into the heat exchanger 5 so as to cool the heated high pressure gas in the pressure container A. The cooled high pressure gas, driven by the blower 33 as previously described, circulates through the outer duct 7a, guide blades H, inner face 2a of the door, and inside 7b of the wind tunnel in the pressure container A, while uniformly cooling the materials 1.

Then, the automatic valve 25 is started to gradually lower the pressure in the pressure container A.

After the materials 1 are cooled, all of the units are shut off, after which the door 2 is opened, and then the materials 1 are conveyed out of the pressure container A to finish one cycle of the operation.

The present invention has such advantages as described below.

Since the gas flow coming out of the outer duct formed between the pressure container's inner face and the wind tunnel's wall is converted by the guide blades into vortexes, which pass through the inside of the wind tunnel, maintaining the gyration, and thus the gas surrounds all over the moldable materials during flowing in the inside of the wind tunnel, and only extremely small air pockets can be produced between the distal end of the outer duct and the inside of the wind tunnel, the distribution of the wind velocities in any portions of the inside of the wind tunnel can be flattened, and the rear sides of the moldable materials can receive the wind of the gas so that the moldable materials are uniformly heated throughout the entire surfaces thereof.

Accordingly, the present invention overcomes the problem of the prior art wherein air pockets produced within the range between the distal end of the outer duct and the inside of the wind tunnel generate useless spaces near the inlet of the wind tunnel in the container and the periphery of the inside of the wind tunnel, so that the moldable materials do not have rear sides which do not receive the wind, and can be closely spaced apart from each other.

As a result, the moldable materials can be uniformly heated everywhere in the pressure container to produce articles of good quality, and the autoclave can be used with high efficiency, so that an increase in the productivity can also be expected.

I claim:

1. In a method for circulating a gas in an autoclave which comprises providing a pressure container, providing a wind tunnel spaced inwardly of the pressure container, placing moldable materials in the wind tunnel, circulating a gas through the wind tunnel by a blower fan, and sealingly closing the pressure container by a door having an inner concave face, the wind tunnel being inside the container in a radially spaced relationship thereto forming an outer duct through which the gas is passed and is reversed in flow direction to pass through the wind tunnel, wherein layers of each of the materials are compressed, heated, adhered together, and set in the pressure container, the improvement comprising:

cylindrically swirling the gas emitted out of the outer duct with guide blades positioned in the outer duct;

adjusting said swirling flow by adjusting the angle of said guide blades relative to the longitudinal flow axis of the container for producing different gas flow characteristics determined by sizes and shapes of molded materials;

diverting the swirling gas along the inner concave face of the door; and directing the diverted gas to flow through the inside of the wind tunnel in a cylindrically swirling flow about the central axis of the wind tunnel.

2. The method as claimed in claim 1 wherein:

said cylindrical swirling is initiated adjacent the end of the outer duct by positioning the guide blades adjacent said end.

3. In an apparatus for circulating gas in an autoclave including a pressure container, a wind tunnel in the container in radial spaced relationship thereto, an outer duct between the container and wind tunnel through which gas flows, an outlet end on the outer duct, moldable materials being placed in the wind tunnel, a blower fan for circulating gas through the outer duct and wind tunnel, the pressure container being sealably closed with a door, compressing means for supplying a high pressure gas into the pressure container to press the moldable materials together, and means for heating and cooling the high pressure gas supplied in the pressure container, so that layers of each of the materials are compressed, heated, adhered together, and set, the improvement comprising:

guide blades in the outer duct for cylindrically swirling the gas emitted out of the outlet end of the outer duct;

adjusting means operatively connected to said guide blades for adjusting the angle of said guide blades relative to the longitudinal flow axis of the container for producing different gas flow directions; and an inner concave face on the door so that the gas is diverted by the inner concave face of the door and directed to flow through the inside of the wind tunnel in a cylindrical swirl about the central flow axis of the wind tunnel.

4. The apparatus as claimed in claim 3 wherein:
said guide blades are positioned adjacent the outlet end of the outer duct.

5. The apparatus as claimed in claim 3 wherein:
said guide blades comprise a plurality of curved circumferentially spaced blades; and
said adjusting means comprises an internally screw threaded boss on each blade, and an externally screw threaded post member extending through a wall of said wind tunnel and engageable with said screw threaded boss for clamping said blade to the outer surface of said wind tunnel.

6. The apparatus as claimed in claim 4 wherein:
said guide blades comprise a plurality of curved circumferentially spaced blades; and
said adjusting means comprises an internally screw threaded boss on each blade, and an externally screw threaded post member extending through a wall of said wind tunnel and engageable with said screw threaded boss for clamping said blade to the outer surface of said wind tunnel.

7. The apparatus as claimed in claim 3 wherein:
said guide blades comprise a plurality of circumferentially spaced vanes; and
said adjusting means comprises an internally screw threaded boss on each vane, and adjusting lever for each vane on the inside of a wall of said wind tunnel, an externally screw threaded post extending through one end of said lever and through the wall of said wind tunnel into engagement with said screw threaded boss for connecting said lever to said vane so that rotation of said lever about the axis of said post varies the angle of said vane relative to the longitudinal axis of said container, and a fastening means on the other end of said lever for fastening said lever and said vane in an adjusted position.

8. The apparatus as claimed in claim 4 wherein:
said guide blades comprise a plurality of circumferentially spaced vanes; and
said adjusting means comprises an internally screw threaded boss on each vane, an adjusting lever for each vane on the inside of a wall of said wind tunnel, an externally screw threaded post extending through one end of said lever and through the wall of said wind tunnel into engagement with said screw threaded boss for connecting said lever to said vane so that rotation of said lever about the axis of said post varies the angle of said vane relative to the longitudinal axis of said container, and a fastening means on the other end of said lever for fastening said lever and said vane in an adjusted position.

9. The apparatus as claimed in claim 7 wherein said adjusting means further comprises:
a ring member adjustably mounted on the inside of said wind tunnel for rotation about the central axis thereof; and wherein
said fastening means on the other end of each lever is connected to said ring so that rotation of said ring member simultaneously adjusts the angle of each vane.

10. The apparatus as claimed in claim 8 wherein said adjusting means further comprises:
a ring member adjustably mounted on the inside of said wind tunnel for rotation about the central axis thereof; and wherein
said fastening means on the other end of each lever is connected to said ring so that rotation of said ring member simultaneously adjusts the angle of each vane.

* * * * *